United States Patent
Chia et al.

(10) Patent No.: US 10,976,501 B2
(45) Date of Patent: Apr. 13, 2021

(54) METHODS FOR FUSING A FIBER TERMINATION

(71) Applicant: Boston Scientific Scimed, Inc., Maple Grove, MN (US)

(72) Inventors: Wen-Jui Ray Chia, Sunnyvale, CA (US); Thomas Charles Hasenberg, Campbell, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 16/230,708

(22) Filed: Dec. 21, 2018

(65) Prior Publication Data

US 2019/0121033 A1 Apr. 25, 2019

Related U.S. Application Data

(63) Continuation of application No. 15/864,642, filed on Jan. 8, 2018, now Pat. No. 10,197,742, which is a
(Continued)

(51) Int. Cl.
*G02B 6/38* (2006.01)
*G02B 6/42* (2006.01)

(52) U.S. Cl.
CPC .......... *G02B 6/3834* (2013.01); *G02B 6/385* (2013.01); *G02B 6/3813* (2013.01); *G02B 6/3855* (2013.01); *G02B 6/4296* (2013.01)

(58) Field of Classification Search
CPC .. G02B 6/4296; G02B 6/3813; G02B 6/3834; G02B 6/3855
See application file for complete search history.

(56) References Cited

U.S. PATENT DOCUMENTS

| | | |
|---|---|---|
| 4,732,448 A | 3/1988 | Goldenberg |
| 6,282,349 B1 | 8/2001 | Griffin |

(Continued)

FOREIGN PATENT DOCUMENTS

| | | |
|---|---|---|
| CN | 104536090 A | 4/2015 |
| WO | WO 2015/063317 A1 | 5/2015 |

OTHER PUBLICATIONS

Wenhua Wang et al, "Temperature self-compensation fiber-optic pressure sensor based on fiber Bragg grating and Fabry Perot interference multiplexing", Optics Communications, vol. 285, No. 16, Apr. 2, 2012, pp. 3466-3470.

*Primary Examiner* — Thomas A Hollweg
*Assistant Examiner* — Mary A El-Shammaa
(74) *Attorney, Agent, or Firm* — Bookoff McAndrews, PLLC

(57) ABSTRACT

Aspects of the disclosure are drawn to methods for producing a fused connector termination. An exemplary method may include setting a specification requirement to be met by the fused connector termination and applying an amount of heat to a proximal region of an unfused connector termination. The proximal region of the unfused connector termination may include an inner optical fiber coaxially positioned within an outer ferrule, and applying the amount of heat may at least partially fuse the optical fiber to the outer ferrule to form an at least partially fused connector termination. The method may also include imaging the proximal region of the at least partially fused connector termination and determining, based on the imaging, whether the proximal region of the at least partially fused connector termination meets the specification.

15 Claims, 6 Drawing Sheets

Related U.S. Application Data continuation of application No. 15/670,159, filed on Aug. 7, 2017, now Pat. No. 9,897,765.

(60) Provisional application No. 62/374,185, filed on Aug. 12, 2016.

(56) References Cited

U.S. PATENT DOCUMENTS

| | | |
|---|---|---|
| 7,430,881 B2 | 10/2008 | Bryant et al. |
| 9,897,765 B1 | 2/2018 | Chia et al. |
| 2004/0042733 A1 | 3/2004 | Kang et al. |
| 2004/0208457 A1 | 10/2004 | Cheng et al. |
| 2007/0106286 A1 | 5/2007 | Harschack et al. |
| 2007/0172174 A1 | 7/2007 | Scerbak et al. |
| 2008/0175539 A1 | 7/2008 | Brown |
| 2009/0207402 A1 | 8/2009 | Contag |
| 2011/0166562 A1 | 7/2011 | Harschack et al. |
| 2011/0235973 A1 | 9/2011 | Acuna |
| 2013/0011102 A1 | 1/2013 | Rinzler et al. |
| 2015/0355416 A1 | 12/2015 | Liu et al. |
| 2018/0045897 A1 | 2/2018 | Chia et al. |

# METHODS FOR FUSING A FIBER TERMINATION

CROSS-REFERENCE TO RELATED APPLICATIONS

This application is a continuation under 37 CFR § 1.53(b) of U.S. application Ser. No. 15/864,642, filed Jan. 8, 2018, which is a continuation of U.S. application Ser. No. 15/670,159, filed Aug. 7, 2017, now U.S. Pat. No. 9,897,765, which claims the benefit of U.S. Provisional Application No. 62/374,185, filed Aug. 12, 2016, the disclosure of all of which are incorporated herein by reference in their entireties.

TECHNICAL FIELD

Aspects of the present disclosure relate generally to methods for manufacturing a fused fiber termination, and, specifically, to methods of using an imaging system to provide feedback during manufacture and for improving the coupling efficiency of fused fiber terminations.

BACKGROUND

Optical fibers are commonly used in medical applications. Optical fibers may be used in numerous procedures to act as optical waveguides for carrying light energy from a laser to a target body region to deliver energy to the target region. For example, in lithotripsy procedures, optical fibers are delivered through an endoscope—e.g., a cystoscope, ureteroscope, renoscope, or nephroscope—and are used to transmit light pulses from a laser source to a location within the body to break up and remove urinary stones.

Glass-clad optical fibers are commonly used in medical applications for delivery of laser energy. The fibers are often terminated with connectors that allow the optical fibers to couple and uncouple from laser delivery systems without compromising the alignment of the optical fiber system. Traditionally, fiber connector terminations often included adhesives to secure the optical fiber to the surrounding glass ferrule; however, issues of outgassing caused contamination of the laser output lens or, in some cases, caused the fiber termination to catastrophically fail.

To overcome the outgassing issues, methods of forming connector terminations were developed that reduced the use of adhesives or avoided the use of adhesives altogether. One solution was to directly fuse the optical fiber core and glass cladding to a surrounding glass ferrule at the termination to create a monolithic glass end that both secures the fiber to the ferrule and aligns the fiber within the ferrule without the use of adhesives. To fuse the fiber and the ferrule to one another at the connector termination, heat may be applied around the sides of the proximal end of the fiber and ferrule and to the proximal face of the connector termination, as is described in greater detail in U.S. Pat. No. 6,282,349, incorporated herein by reference in its entirety.

Yet, fused connector terminations require precise positioning between the fiber, ferrule, and heat source(s) in order to achieve the desired geometries for high coupling efficiency from the laser energy into a fiber body. Creating smooth and consistent concave- or convex-shaped connector terminations on the proximal face and controlling the fusion of the ferrule and the optical fiber along the sides, both of which are important for the coupling efficiency of the manufactured connector termination, can become an issue with fused connectors. Coupling efficiency is affected by, among other things, (i) the concentricity of the optical fiber within the fused ferrule, (ii) the geometry and depth of the concave (or convex) fused terminal surface, (iii) the smoothness of the fused terminal surface, and (iv) the shape and taper ratio of the tapered fiber, for example.

Currently, there is no way of controlling the fusion process in real time to ensure that the finished, fused connector termination has satisfactory coupling efficiency. Instead, heat is applied to the glass fiber and ferrule to fuse them together, and then post-fusion inspections are carried out to determine whether the fused connector meets manufacturing requirements. This uncontrolled manufacturing method may lead to large amounts of waste or manufacturing inefficiencies, because improperly fused connectors must be discarded.

As a result, a need exists for methods of manufacturing fused connector terminations that allows for tighter control of the fusion process. Specifically, a need exists for a method that allow for real-time assessment and control of the fusion process to promote increased coupling efficiency of the manufactured connectors and reduce waste.

The devices and methods of the current disclosure may rectify some of the deficiencies described above or address other aspects of the prior art.

SUMMARY OF THE DISCLOSURE

Aspects of the present disclosure are directed to methods for producing a fused connector termination. An exemplary method may include setting a specification requirement to be met by the fused connector termination and applying an amount of heat to a proximal region of an unfused connector termination. The proximal region of the unfused connector termination may comprise an inner optical fiber coaxially positioned within an outer ferrule, and applying the amount of heat may at least partially fuse the optical fiber to the outer ferrule to form an at least partially fused connector termination. The method may also include imaging the proximal region of the at least partially fused connector termination and determining, based on the imaging, whether the proximal region of the at least partially fused connector termination meets the specification.

Various aspects of the method may include one or more of the features below. The amount of heat may be a first amount of heat and, if the proximal region of the at least partially fused connector termination is determined to not meet the specification, the method may further comprise applying a second amount of heat to the proximal region of the at least partially fused connector termination, and the imaging step and the determining step may be repeated after applying the second amount of heat. The applying step, the imaging step, and the determining step may be repeated until the proximal region of the at least partially fused connector termination is determined to meet the specification. In some aspects, the first amount of heat may be different than the second amount of heat, or, the first amount of heat may be the same as the second amount of heat. The amount of heat may be applied to one or more of a proximal face of the connector termination and a side of the connector termination. Imaging the proximal region may include focusing three or more imaging devices on the proximal region. The one or more imaging devices may be oriented to view the proximal region along a z-axis and at least one of an x-axis and a y-axis, and imaging the proximal region may include focusing one or more imaging devices on at least two locations on the proximal region. Determining whether the proximal region of the at least partially fused connector termination meets the specification may include determining whether at least one of a diameter, a depth, a curvature, or a surface smoothness of a dish formed on a proximal face of the at least partially fused connector termination meets the specification based on one or more images of the proximal face captured along a z-axis. In further aspects, the one or more images of the proximal face may include at least one of an image focused on an edge of the dish or an image focused on a central region of the dish. Determining whether the proximal region of the at least partially fused connector termination meets the specification may include determining whether at least one of a depth of heat penetration, extent of fusion of the optical fiber to the outer ferrule, or relative location of the optical fiber within the outer ferrule meets the specification based on one or more images of the proximal region captured along a side of the connector terminal. The one or more images of the side of the connector terminal may include at least one of an image focused on an outer surface of the outer ferrule, an image focused on an inner surface of the outer ferrule, or an image focused on an outer surface of the optical fiber. Imaging the proximal region of the at least partially fused connector termination may be performed using an optical microscope, and, in some aspects, at least one of an imaging device, the connector termination, or a heat source may be moved when imaging the proximal region of the at least partially fused connector termination or when applying heat to the proximal region.

In accordance with another aspect, a method for producing a fused connector termination may include selecting a specification requirement to be met by the fused connector termination and applying a first amount of heat to a proximal region of an unfused connector termination. The proximal region of the unfused connector termination may comprise an inner optical fiber coaxially positioned within an outer ferrule, and the first amount of heat may partially fuse the inner optical fiber to the outer ferrule at the proximal region. The method may further include imaging a proximal face of the partially fused connector termination and imaging a side region of the partially fused connector termination. Based on the imaging of the proximal face and the imaging of the side region, the method may also include determining where to apply a second amount of heat to the proximal region of the partially fused connector termination and applying the second amount of heat to the proximal region of the partially fused connector termination. The method may include imaging at least one of the proximal face of the partially fused connector termination or the side region of the partially fused connector termination and determining whether the proximal region of the partially fused connector termination meets the specification.

In various aspects, applying the first amount of heat may include applying heat to the proximal face and to the side region. In some aspects, applying the second amount of heat may include applying heat to one or more of the proximal face and the side region. The first amount of heat and the second amount of heat may be different.

In another aspect of the disclosure, a method for producing a fused connector termination may include selecting a specification requirement to be met by the fused connector termination and applying a first amount of heat to a proximal region of an unfused connector termination. The proximal region of the unfused connector termination may comprise an inner optical fiber coaxially positioned within an outer ferrule, and the first amount of heat may partially fuse the inner optical fiber to the outer ferrule at the proximal region. The method may also include focusing an imaging device on at least one portion of a proximal face of the partially fused connector termination and focusing an imaging device on at least one portion of a side region of the partially fused connector termination. Based on the imaging of the proximal face and the imaging of the side region, the method may also include determining how to apply a second amount of heat to the proximal region of the partially fused connector termination and applying the second amount of heat to the proximal region of the partially fused connector termination. The method may further include focusing an imaging device on at least one of a portion of the proximal face or a portion of the side region and determining whether the proximal region of the at least partially fused connector termination meets the specification.

Additional objects and advantages of the aspects will be set forth in part in the description that follows, and in part will be obvious from the description, or may be learned by practice of the aspects. It is to be understood that both the foregoing general description and the following detailed description are exemplary and explanatory only and are not restrictive of the claims.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus.

BRIEF DESCRIPTION OF THE DRAWINGS

The accompanying drawings, which are incorporated in and constitute a part of this specification, illustrate the disclosed aspects, and together with the description, serve to explain the principles of the disclosed aspects. In the drawings.

DETAILED DESCRIPTION

Reference will now be made in detail to the exemplary aspects of the present disclosure described below and illustrated in the accompanying drawings. Wherever possible, the same reference numbers will be used throughout the drawings to refer to same or like parts. Both the foregoing general description and the following detailed description are exemplary and explanatory only and are not restrictive of the features, as claimed. The term "exemplary" is used herein in the sense of "example," rather than "ideal." As used herein, the terms "about," "substantially," and "approximately," indicate a range of values within +/−5% of a stated value. The term "proximal" refers to a position closer to the connector end of a fiber connector termination that couples with a laser source. The term "distal" as used herein refers to a position further from the connector end of a fiber connector termination.

Aspects of the present disclosure are generally drawn to methods for producing fused connector terminations using integrated imaging systems to provide real-time feedback and improved control over the manufacturing process. By obtaining real-time feedback, heat may be applied to the ferrule and fiber incrementally, instead of all at once, to provide increased control over the fusion process, as will be described in detail below in reference to the exemplary aspects.

Figure 1A:
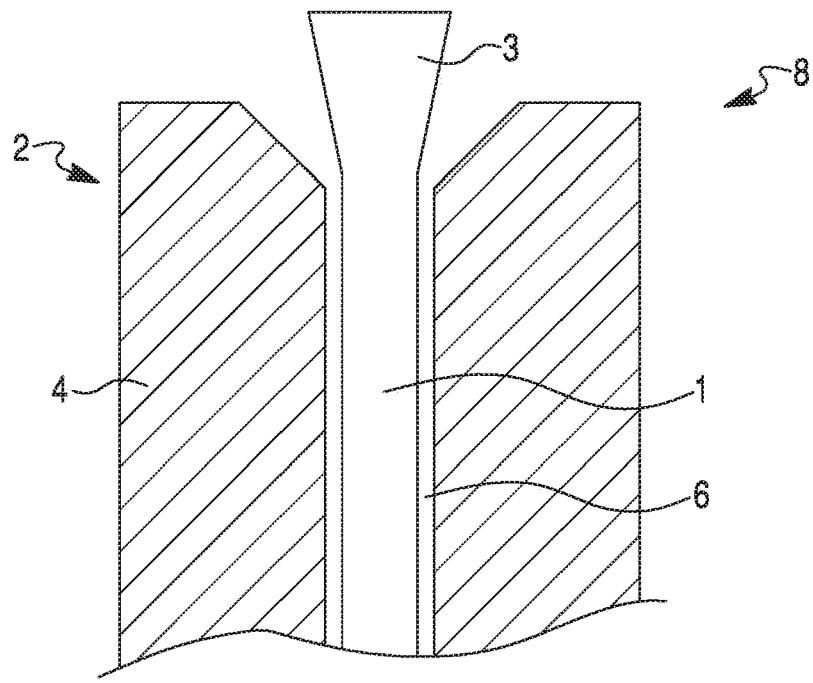
FIG. 1A is a schematic illustration of a fiber connector termination with a tapered optical fiber.
Figure 1B:
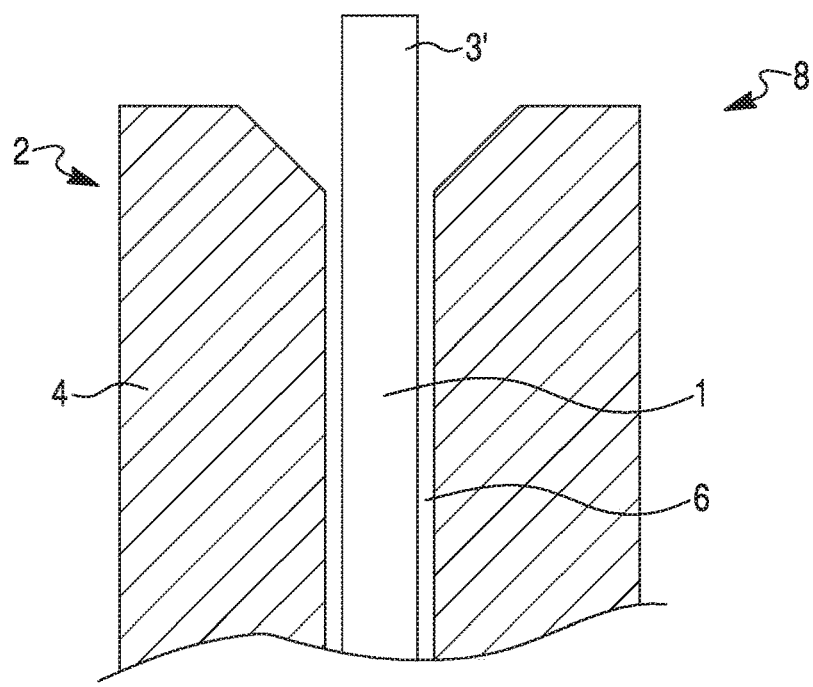
FIG. 1B is a schematic illustration of a fiber connector termination with a non-tapered optical fiber.

FIGS. 1A and 1B depict schematic views of standard fiber connector terminations prior to fusion. FIG. 1A shows a connector termination 8. Connector termination 8 includes an optical fiber 1 having a tapered proximal end 3, and FIG. 1B shows an optical fiber 1 having a non-tapered proximal end 3'. Optical fiber 1 may be formed of, e.g., silica, and may include one or more layers of cladding, coating(s), and/or protective jacket(s), such as one or more layers of polymer or nylon, surrounding the silica core at a proximal region. In aspects in which optical fiber 1 includes cladding, coating(s), and/or jacket(s) comprised of polymeric materials, these polymers may stop short of the proximal end of optical fiber 1, or may be removed from the proximal end of optical fiber 1, prior to fusing optical fiber 1 to ferrule 4. Optical fiber 1 extends from a distal end (not shown) that extends into the body to proximal end 3. Exemplary optical fibers 1 may range in glass diameter from approximately 100 µm to approximately 1,000 µm. Exemplary glass cladding may range in diameter from approximately 100 µm to approximately 1,100 µm. Exemplary taper diameters, if applicable, may range in maximum diameter from approximately 130 µm to approximately 800 µm. The exemplary sizes provided herein serve as examples only and are not restrictive.

Optical fiber 1 is surrounded along at least a portion of its length by a ferrule 4. Ferrule 4 may be formed of, e.g., glass, silica, or quartz. Ferrule 4 may be cylindrical and may have a central opening 6 extending along a longitudinal axis of ferrule 4. Opening 6 may be dimensioned to receive optical fiber 1 within it. Optical fiber 1 may thus fit concentrically within opening 6 in ferrule 4, so that optical fiber 1 and ferrule 4 are aligned coaxial with one another at proximal region 2 of connector termination 8. A proximal end of opening 6 extends along the longitudinal axis of ferrule 4, or the proximal end of opening 6 may be chamfered, e.g., flare outwards so that the proximal-most end of opening 6 is wider than a distal region of opening 6, as is shown in FIGS. 1A and 1B. Exemplary glass ferrules 4 may have an outer diameter of approximately 1,000 µm to approximately 1,700 µm.

Figure 2A:
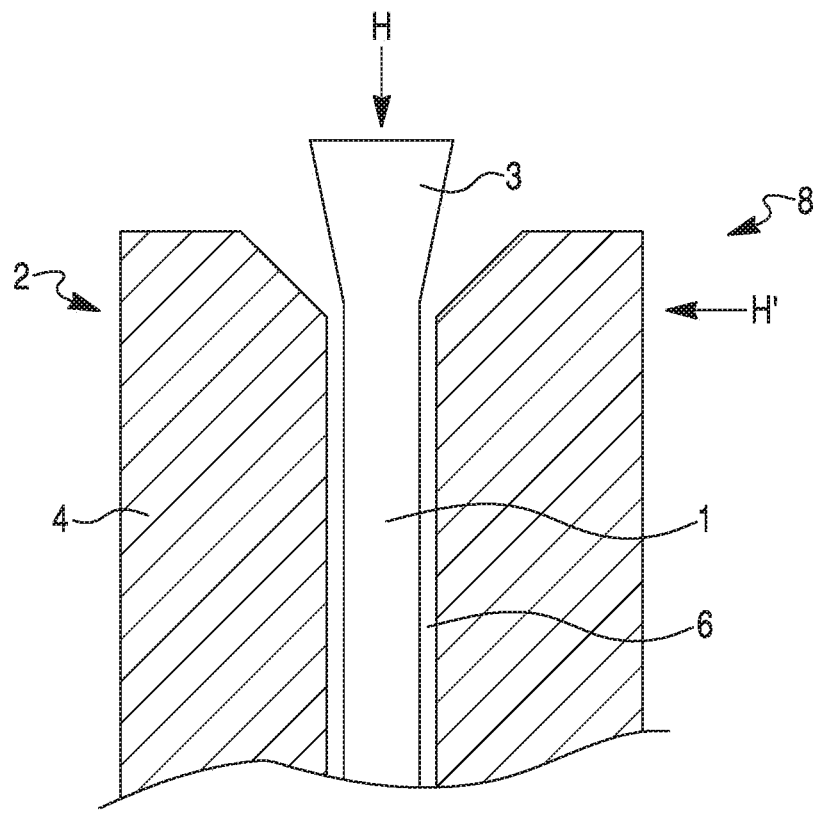
FIG. 2A is a schematic illustration of applying heat to a fiber connector termination in order to fuse an optical fiber to a glass ferrule.
Figure 2B:
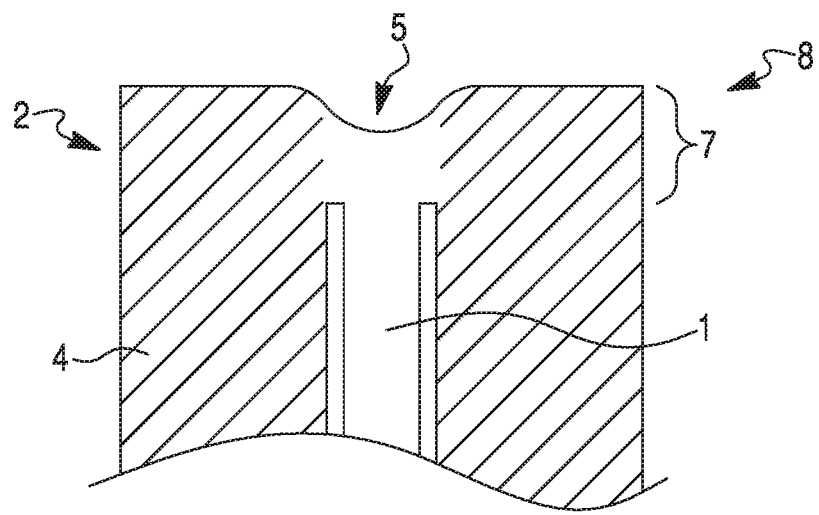
FIG. 2B is a schematic illustration of the fiber connector termination depicted in FIG. 2A once the optical fiber has been fused to the glass ferrule.

As discussed above, a fused fiber connector termination 8 may be formed by fusing optical fiber 1 and ferrule 4 to each other to create an integral structure at fused region 7 (FIG. 2B) at proximal region 2. FIG. 2A shows arrows H (optional heat source) and H', which depict representative directions from which heat may be applied to ferrule 4 and optical fiber 1 to fuse the two components together. For example, heat may be applied to the proximal face of ferrule 4 and optical fiber 1, as shown by arrow H (optional), and heat may be applied to one or more sides of ferrule 4 and optical fiber 1, as shown by arrow H'. Ferrule 4 and optical fiber 1 may be rotated and/or tilted as heat is applied to the sides of ferrule 4 and optical fiber 1, the heat may be moved around the proximal region of ferrule 4 and optical fiber 1, or the heat may be applied from multiple sides of ferrule 4 and optical fiber 1 at once, or any suitable combination thereof. FIG. 2B shows fused region 7 formed by the heating of FIG. 2A. Following fusion, a concave face 5 may be formed on the proximal face of the fused connector termination. Although a concave face is depicted in FIG. 2B, one of ordinary skill in the art will understand that, depending on the intended use of optical fiber 1, a convex face or a substantially flat face may be formed at the proximal end.

As explained above, standard production of fused terminal connectors generally includes a one-step method of applying heat to proximal region 2 of optical fiber 1 and ferrule 4 to create fused region 7. Process verification is typically limited to post-fusion visual inspection to identify defects and/or determination of system-level transmission measurements once connectorized. Fully assembled fibers are generally then scrapped if the transmission measurements fail to meet one or more predetermined specifications. Such one-step methods may provide little manufacturing control over the fusion process, and post-processing-only evaluation may lead to manufacturing inefficiencies. Further, the inability to control fusion may lead to losses in coupling efficiency. To overcome one or more of these disadvantages, an integrated imaging process is described herein.

Figure 3A:
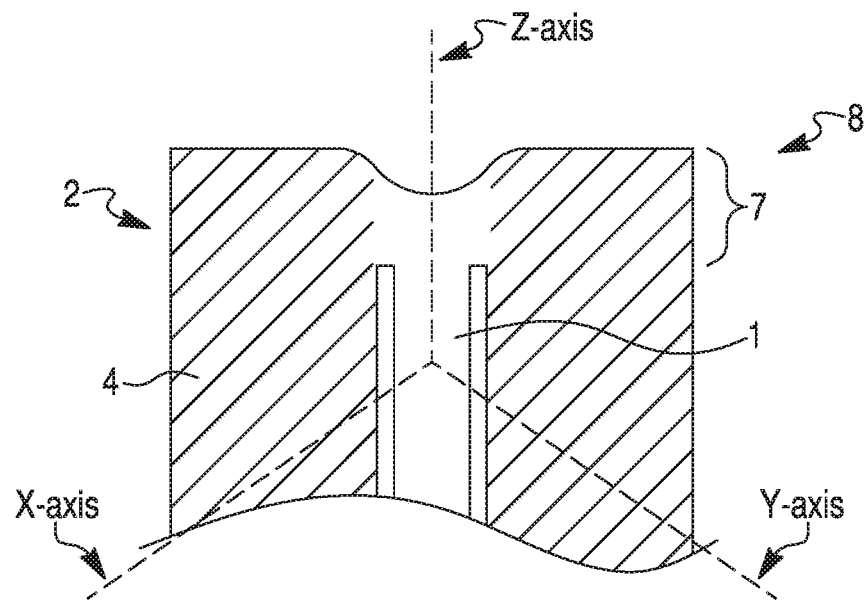
FIG. 3A schematically depicts axes along which one or more imaging devices may be oriented relative to a fiber connector termination, in accordance with exemplary aspects of the present disclosure.

An exemplary integrated imaging system and method may include one or more optical imaging devices for viewing proximal region 2 of ferrule 4 and optical fiber 1 before, during, and/or after fusion. FIG. 3A schematically depicts exemplary axes along which one or more imaging devices may be oriented to view the fusion process and provide feedback. For example, imaging devices may be arranged to view proximal region 2 of connector termination 8 along the x-axis and y-axis, as well as from the z-axis. Imaging along the z-axis may provide real-time information about the formation of the proximal face, including, e.g., the width, depth, curvature, and/or smoothness of the concavity (or, in some aspects, convexity or flatness) of the proximal face. Imaging along the x- and y-axes may provide information about the completeness of fusion (i.e., the penetration depth of the heat and the extent to which optical fiber 1 and ferrule 4 have become a monolithic structure). Imaging along the x- and y-axes may also be used to measure the fiber geometry, since a glass ferrule 4 may be transparent or opaque, allowing the imaging system to focus on optical fiber 1 within central opening 6. Additionally, imaging along the z-, x-, or y-axes may provide information about the concentricity and/or alignment of optical fiber 1 within opening 6 of ferrule 4.

Figure 3B:
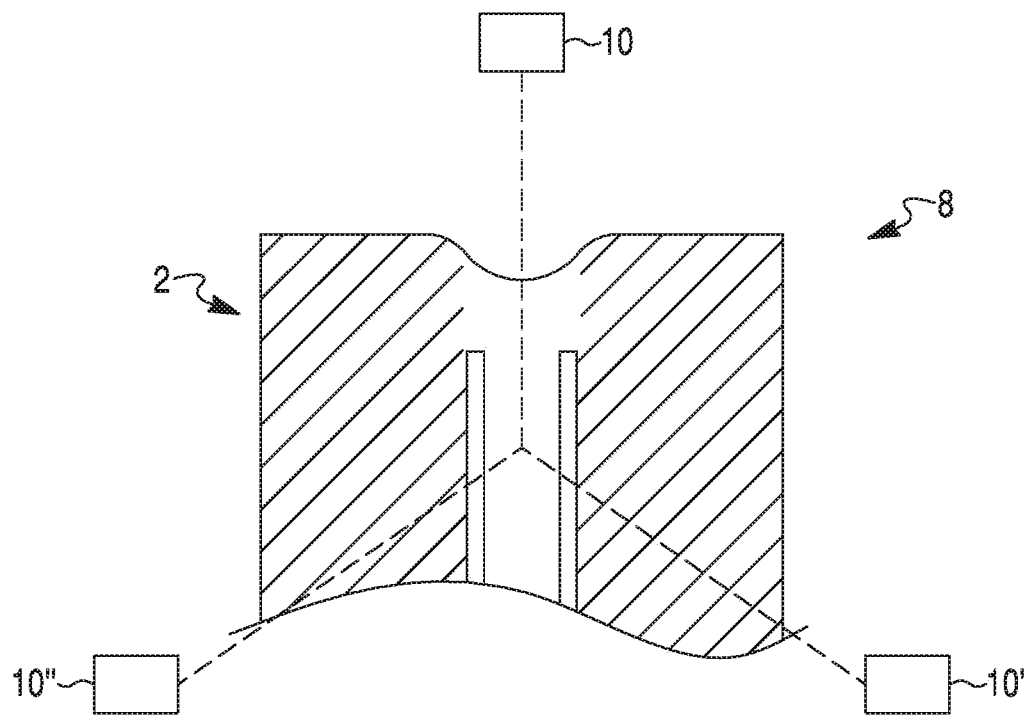
FIG. 3B schematically depicts a plurality of imaging devices oriented around a fiber connector termination for imaging the fiber connector termination along the axes of FIG. 3A, in accordance with exemplary aspects of the present disclosure.

Although three viewing axes are shown in FIG. 3A, it is contemplated that a single viewing axis, two viewing axes, or more than three viewing axes may be used to provide feedback. Additionally, FIG. 3B depicts imaging devices 10, 10', and 10", collectively referred to as imaging devices 10, which may be oriented to view proximal region 2 along each of the axes in FIG. 3A. However, if more or fewer viewing axes are used, then more or fewer imaging devices 10 may be used. In some aspects, each imaging device 10 may be oriented to provide imaging along a single axis, for example, the number of viewing axes and the number of imaging devices may be equal. In such aspects, each imaging device may be stationary along its respective imaging axis. In some aspects, however, one or more imaging devices 10 may be moveable to provide imaging along more than one axis. For example, a single imaging device may provide imaging of the proximal face along the z-axis and then may also be moveable to provide imaging from a side of proximal region 2. In some aspects, some of the imaging devices may be stationary, while other imaging devices may be moveable. For example, imaging device 10 along the z-axis may be stationary, while one or more of imaging devices 10' or 10" may be moveable along the x- or y-axis. Further, in some exemplary aspects, stationary or moveable imaging devices may be configured to tilt relative to connector termination 8. And, whether or not stationary or moveable imaging devices are used, ferrule 4 and optical fiber 1 may be moved (e.g., rotated or tilted) relative to the imaging devices and/or heat sources before, during, and/or after the fusion process to provide imaging along different angles or to modify where on proximal region 2 heat is applied.

Exemplary imaging systems may include, for example, one or more optical microscopes. An optical microscope may include an objective lens with a light source. The microscope may be focused on different regions of the terminal connector to obtain different views of the proximal region in order to assess various information about the fusion process, as will be described in detail below. In some aspects, the imaging system may also include, e.g., a CMOS and/or CCD sensor, or other suitable imaging devices.

By integrating an imaging system with the process of heating and fusing a connector terminal, incremental heating may be applied to more finely control the fusing of ferrule 4 with optical fiber 1 and the surface properties of the proximal face. By monitoring and controlling these characteristics, coupling efficiency may be improved. As mentioned above, the primary parameters that affect coupling efficiency include (i) the concentricity of the optical fiber within the fused ferrule, (ii) the geometry, depth, and curvature of the concave or convex fused terminal surface, (iii) the shape and the tapered ratio of the optical fiber, and (iv) the smoothness of the fused terminal surface. For example, the origin of both the optical fiber and the ferrule should be substantially the same. This characteristic may be controlled prior to heating, e.g., by positioning optical fiber 1 within opening 6 of ferrule 4 and by positioning the proximal region within the integrated imaging and heating system. This characteristic may also be controlled during heating (e.g., if optical fiber 1 becomes off-centered during fusion) by tilting or rotating the heating source and/or connector termination 8 or by applying heat uniformly or non-uniformly around the side of connector termination 8.

Likewise, the diameter and shape of the optical fiber may be controlled prior to heating or may be controlled or affected during heating. For example, an optical fiber with a particular shape (e.g., tapered or non-tapered, or degree of tapering) or particular size may be selected for inclusion within opening 6 of ferrule 4. In some aspects, heating may be applied to a proximal end of optical fiber 1 as an initial step or as part of the heat application in order to modify the end of the optical fiber (e.g., create tapering on a non-tapered fiber or modify the angle of a tapered fiber).

The geometry, depth, and curvature of the proximal face of the fused terminal surface may be controlled during the heating process. Ideally, the concave or convex proximal surface should behave like an optical lens, with the refraction affecting the location of the focal point. The smoothness and shape of the terminal surface may also be controlled during the heating process to improve coupling efficiency by reducing scattering loss. By providing feedback from an integrated imaging system, heat application may be controlled to provide a smoother terminal surface. By reducing surface roughness, light scattering may be reduced, and thus less light energy may be lost by the optical fiber during use.

Thus, by providing feedback, heat application may be controlled and incrementally applied in order to control the parameters of the connector termination that affect coupling efficiency, thereby improving coupling efficiency.

Figure 4A:
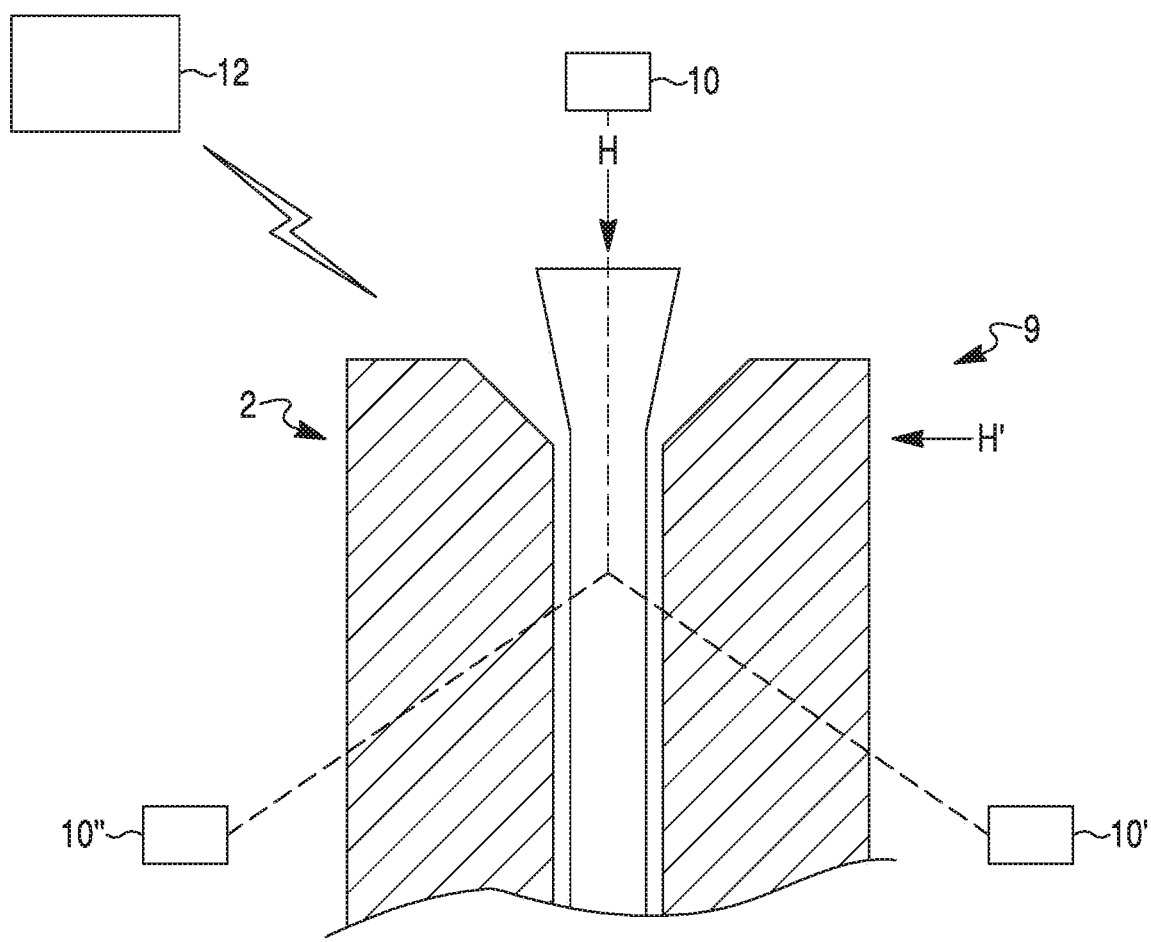
FIG. 4A schematically depicts an integrated imaging and fusion system and connector termination prior to fusion, in accordance with exemplary aspects of the present disclosure.

In one exemplary method, a connector termination 8 having an optical fiber 1 within opening 6 of ferrule 4 may be situated within an integrated imaging and fusion system 9, as shown in FIG. 4A. One or more imaging devices 10 may be located around proximal region 2 of optical fiber 1 and ferrule 4 and may be focused on proximal region 2. One or more heat sources H, H' may be located adjacent proximal region 2. For example, heat source H may be directed towards the proximal face of fiber 1 and ferrule 4, and one or more heat sources H' may be directed towards a side of proximal region 2. In some aspects, a single heat source may be moved during the fusion process to apply heat to both the proximal face and a side of proximal region 2. Or, heat source H may be directed towards the proximal face, and one or more heat sources H' may be directed towards a side of proximal region 2, and the one or more heat sources H' may be moved around a circumference of ferrule 4. Alternatively or additionally, proximal region 2 may be rotated or tilted relative to the heat source(s) in addition to or instead of movement of the one or more heat sources.

Exemplary heat sources may include, e.g., laser energy (such as a $CO_2$ laser ranging from between about 1 to 500 W), electric arc discharge (of similar wattage), and/or a flame. These heat sources may be oriented substantially perpendicular to optical fiber 1 and ferrule 4 (H'), or longitudinally to the optical fiber (H). The heat source(s) and/or optical fiber 1 and ferrule 4 may or may not be rotated or tilted relative to one another.

In some aspects, integrated imaging and fusion system 9 may be arranged so that placing connector termination 8 within the integrated system automatically positions connector termination 8 relative to the imaging device(s) and/or heat source(s). For example, a holder or clamp may position connector termination 8 relative to imaging devices 10. In other aspects, one or more of connector termination 8, the imaging device(s), and/or the heat source(s) may be moved and/or positioned relative to one another. Additionally, in some aspects, the positioning of the various components relative to one another may be pre-set or may be predetermined based on, e.g., one or more of the size of the connector termination, the intended use of the connector termination, the type of materials that make up the ferrule and/or the optical fiber, the required specifications of the finished connector termination, the intended shape (e.g., convex or concave proximal face) of the finished connector termination, the type of heat source used in the system, the amount of heat to be applied, or any suitable combination thereof. In some aspects, an operator may input the relevant information into the integrated system, and the integrated system may automatically adjust the relative positioning and location of the various components. In some aspects, an operator may input the relative positioning and location of the various components and then the system may automatically make the adjustments. In such exemplary aspects, system 9 may include one or more processors 12 in order to store and/or calculate specifications and/or positioning information and/or to control positioning of the relative components. In some aspects, an operator may position and locate the components relative to one another manually.

In exemplary aspects, system 9 may include a user interface for inputting information into the system, e.g., a keyboard, touch screen, levers, buttons, knobs, or other suitable input devices or combinations of input devices for controlling or adjusting the settings, inputting predetermined specifications, and/or inputting information about the particular connector termination 8 and/or its intended use. System 9 may also include a display device for outputting one or more of the imaging feedback captured by the imaging device(s), information regarding the predetermined specifications input into the system, information regarding the quality of the connector termination being manufactured, information regarding the status of the fusion process, or any other suitable output. The display device may include a monitor, a screen, a series of lights, or other suitable visual indicators or combinations thereof. Components of system 9, e.g., one or more imaging devices, heat sources, user interfaces, display devices, and/or processors 12 may be coupled to each other via wireless or wired connections, or a combination thereof.

Once the components are in place, heat may be incrementally applied to connector termination 8 to fuse ferrule 4 and optical fiber 1 together. In one exemplary aspect, a first amount of heat may be applied to proximal region 2 of connector termination 8. Heat application may occur automatically according to the programming and specifications input into system 9, or may be manually triggered by an operator.

Figure 4B:
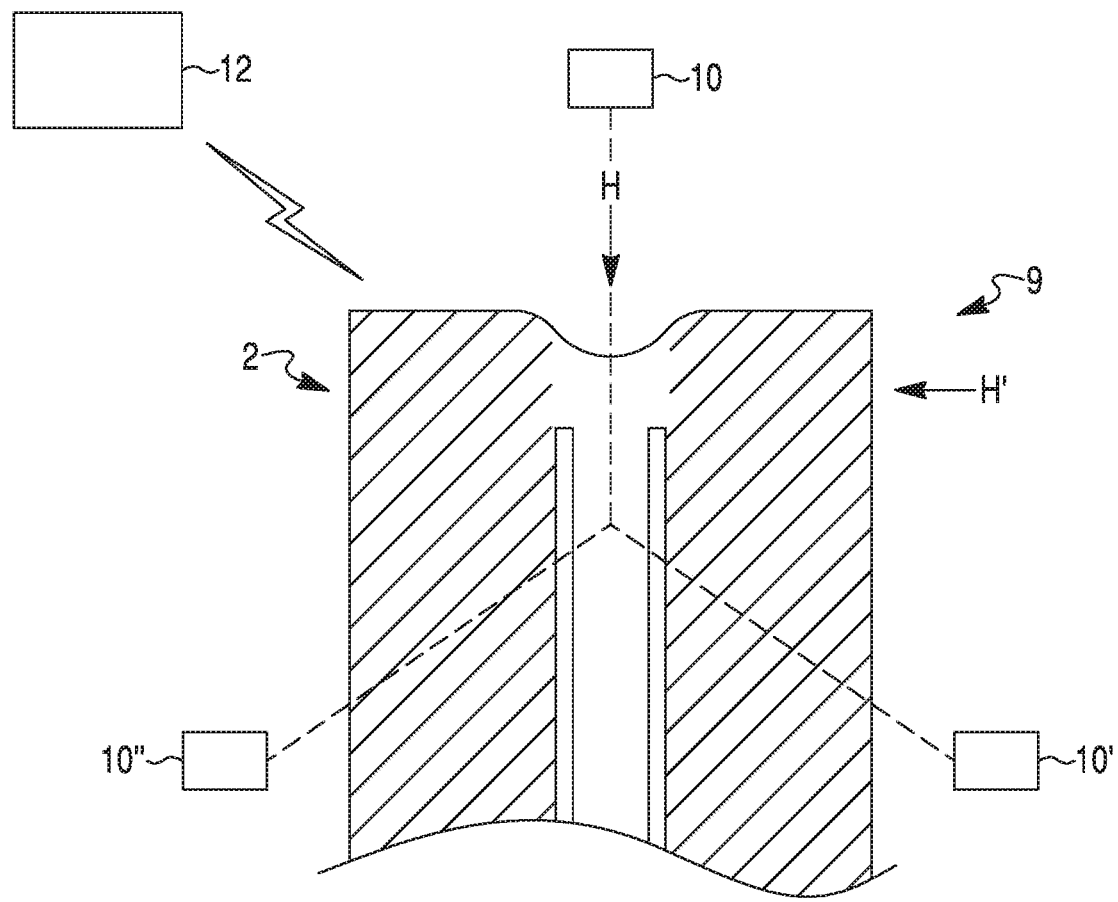
FIG. 4B schematically depicts the integrated imaging and fusion system of FIG. 4A and connector termination after commencement of fusion.

FIG. 4B schematically depicts a connector termination 8 that has begun fusing after the application of heat. After applying the first amount of heat, imaging device(s) 10 may image connector termination 8 and provide feedback to system 9. For example, pre-set process specifications, measurements, and tolerances for the finished, fused connector termination 8 may be determined and input into system 9 at the outset or may be programmed or stored in processor 12. One or more imaging devices may focus on and image different aspects of connector termination 8 after the first application of heat (and/or after subsequent applications of heat) in order to assess how the fusion is progressing relative to the predetermined specifications.

For example, an imaging device oriented along the z-axis may be used to assess whether the proximal face of connector termination 8 is forming in accordance with the predetermined specifications. The imaging device may provide feedback regarding, e.g., the smoothness of the surface. In some aspects, a concave or convex proximal face of a specific diameter, curvature, and depth may be desired. The imaging device oriented along the z-axis may be focused on one or more locations on the outer edge of the concave or convex dish to assess, e.g., diameter size, circumference, or uniformity of dish shape. The imaging device may also be focused on a central portion of the dish, and the images of the outer edge and of the central portion may together provide information about the depth and/or curvature of the concave or convex dish. This information may be relayed to processor 12 of system 9, which may then use this imaging feedback to decide in real time how much heat to apply next, where the heat should be applied next, at what angle the heat should be applied, or whether no additional heat should be applied, depending on how the imaging feedback and observed measurements compared to the predetermined specifications (e.g., within or outside of a predetermined acceptability range).

For example, if the imaging feedback indicated that the depth of a concave portion of the proximal face fell short of the predetermined specifications, then additional heat may be applied to a side portion of connector termination 8 in order to increase the depth of the concavity. In some aspects, the depth of the dish may need to meet a specification ranging within approximately sub-microns to approximately 500 µm. In some aspects, if the imaging feedback indicates that the dish shape is not symmetrical, then heat may be applied at an angle, either by tilting the heat source and/or by tilting connector termination 8. In some aspects, if the imaging feedback indicates that the surface finish of the proximal face is not smooth enough, or indicates that the diameter of the concave or convex dish is too small, additional heat may be applied along the z-axis in order to smooth the surface finish of the proximal face and/or increase the size of the dish. In some aspects, the size of the dish may need to meet a specification ranging within approximately 50 µm to approximately 1,700 µm. If the proximal face meets the predetermined specifications, then no additional heat may be applied to the proximal face along the z-axis.

In some aspects, an imaging device located along the z-axis may use one or more of bright field and dark field imaging modalities. For example, bright field imaging may be used to measure depth, size, geometry, or other similar characteristics of the proximal face. Dark field imaging may be used to measure, e.g., roughness and finish of the surface of the proximal face. For example, dark field imaging may block out directly transmitted light from the center of the field, allowing for detection of only light entering the imaging device from around the edges so that the imaging device detects only scattered light. In some aspects, the imaging device may be switched between bright-field and dark-field imaging modalities.

In some aspects, one or more imaging devices located around a side of proximal region 2 may be focused on one or more of an outer surface of ferrule 4, an inner surface of ferrule 4 defining opening 6, or on an outer surface of optical fiber 1 within ferrule 4 (which may be visible due to the transparency of surrounding ferrule 4). One of these images may be captured individually, or a combination of images may be captured and compared relative to one another. The one or more images may be relayed in real time to processor 12 of system 9 to assess progress of fusion between optical fiber 1 and ferrule 4. For example, the images may be used to assess one or more of the depth of heat penetration during the application of heat, the extent to which optical fiber 1 and ferrule 4 have fused together, the relative spacing or concentricity of optical fiber 1 within ferrule 4, and/or whether this spacing or concentricity has been affected by the fusion process. This imaging information may then be used to determine whether additional heat should be applied, if so, how much heat should be applied, and at what angle or position to apply additional heat. For example, if adequate fusion of optical fiber 1 and ferrule 4 has not been achieved, additional heat may be applied substantially uniformly around the sides of proximal region 2. If the angle or positioning of optical fiber 1 within ferrule 4 does not meet the predetermined specifications, then additional heat may be applied at an angle relative to the outer surface of ferrule 4 (e.g., not perpendicular to the outer surface) or to one portion of proximal region 2.

In some aspects, the images captured and assessments made may change as additional heat is applied. For example, once one characteristic of the connector termination falls within the predetermined specifications, then images to assess that characteristic may no longer be captured after additional rounds of heating. In some aspects, each characteristic assessed may continue to be assessed as additional rounds of heating are applied, even if one or more characteristics have been observed as meeting the predetermined specifications based on the feedback imaging. For example, the characteristics may continue to be assessed in order to confirm that the additional rounds of heating have not caused the characteristic to fall outside of the predetermined specifications. In some aspects, a final set of images may be obtained after all characteristics have been found to meet the predetermined specifications in order to provide one last holistic quality assessment of each characteristic of the fused connector termination.

In aspects utilizing more than one imaging device, the imaging devices may each provide feedback to system 9, and processor 12 may combine and/or compare the imaging information to determine whether the fusion of connector termination 8 meets the predetermined specifications. In aspects utilizing one imaging device, for example, an imaging device that is moved relative to proximal region 2 to image different portions of connector termination 8 (e.g., a proximal face and a side region), the imaging device may be positioned around connector termination 8 and feedback from each relative position may be relayed to processor 12. Or, in some aspects, only one imaging device may be used, e.g., to assess either a proximal face or a side portion of connector termination 8.

The heat application and imaging steps may be performed and repeated as many times as necessary until the fused connector termination 8 meets the predetermined specifications.

During heat application, heat may be applied optionally to a side of proximal region 2 or to the proximal face, or the heat may be applied simultaneously to both the side and the proximal face. For example, heat may be applied uniformly from all directions at the same time or may be applied from one side then another or from only the top along the z-axis or from only the side along the x- and/or y-axis. To achieve uniform fusion, one or more heat sources may be moved around proximal region 2, and/or connector termination 8 may be rotated relative to the heat source(s). In each subsequent round or rounds of heat application, heat may be applied according to the imaging feedback received. For example, if the imaging feedback indicates that the proximal face meets predetermined specifications, then no additional rounds of heating may be applied along the z-axis. If the imaging feedback indicates that the fusion of optical fiber 1 and ferrule 4 meets the predetermined specifications, then no additional rounds of heating may be applied to a side region. In some aspects, however, even if the fusion of fiber 1 and ferrule meets the predetermined specifications, but the curvature of the proximal face is too deep, then additional heat may be applied to the side of proximal region 2 in order to create a shallower curvature. Accordingly, whether additional heat is applied to a given location, the amount of additional heat applied to a given location, and/or the direction from which heat is applied to a given location may depend on imaging feedback received from that particular location or may depend on imaging feedback received from a different location of the connector termination, or both.

In some aspects, the same amount of heat may be applied during each round of heat application. In other aspects, the amount of heat in subsequent rounds of heat application may be determined, at least in part, in real-time based on the feedback, e.g., the amount by which a characteristic of the imaged connector termination 8 deviates from the predetermined specifications. If greater deviations from the specifications are detected by the imaging devices, then more heat may be applied, and/or heat may be applied for a longer duration of time. If smaller deviations are detected, then less heat may be applied, and/or heat may be applied for shorter durations of time.

In some aspects, the method of producing a heat-fused connector termination 8 may further include shaping the proximal end of optical fiber 1 prior to fusion. For example, as is shown in FIGS. 1A and 1B, either a tapered or a non-tapered optical fiber 1 may be used to form a fused connector termination 8. In some aspects, the production method may include first applying heat to the proximal region of a non-tapered optical fiber 1 in order to first create a tapered shape. In other aspects, a non-tapered optical fiber 1 may be used, and the initial tapering step may not be included. In still other aspects, a tapered optical fiber may be used and the initial tapering step may not be included. In other aspects, a tapered optical fiber may be used and the initial tapering step may be included to change the angle of taper at the proximal end of the optical fiber.

Figure 5:
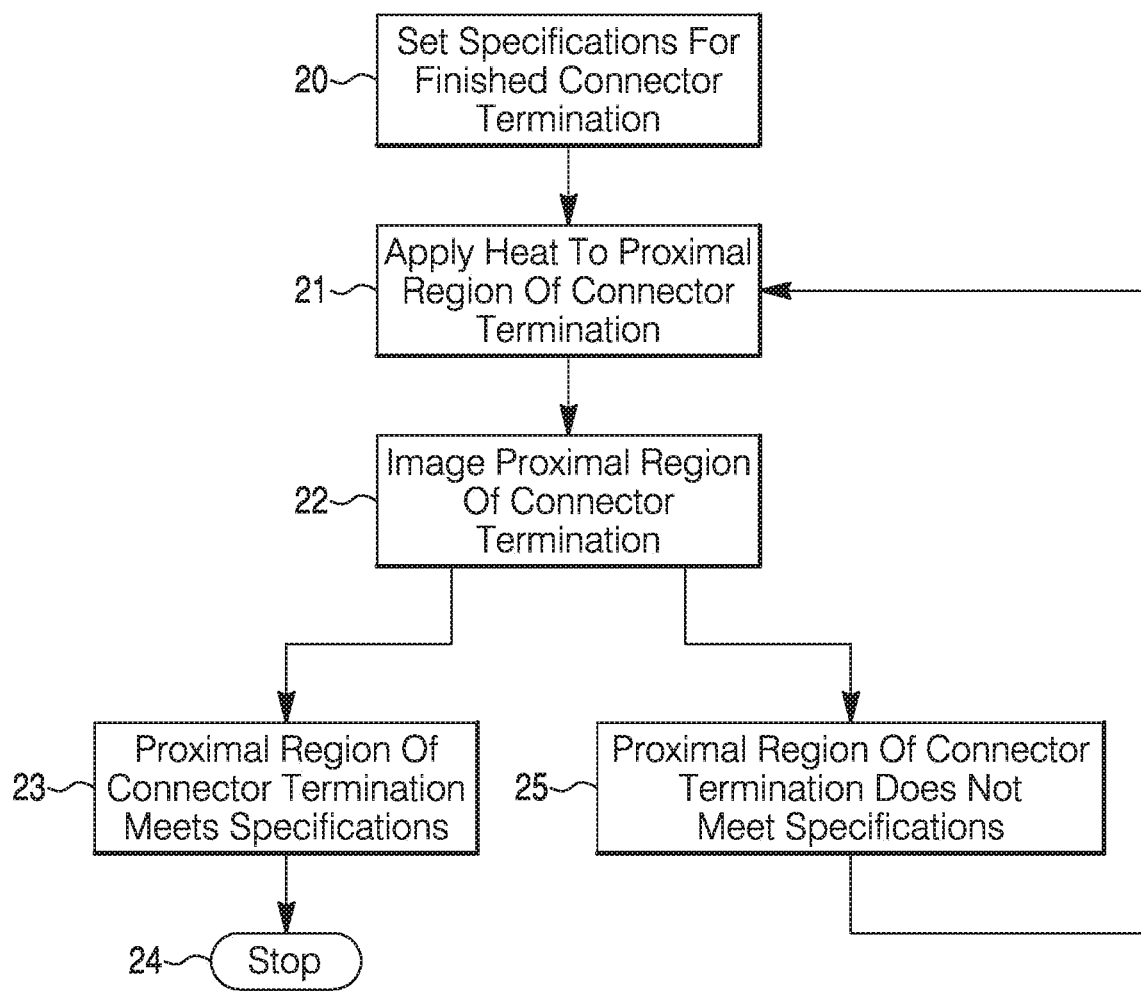
FIG. 5 is a flow chart depicting steps of an exemplary method for fusing a connector termination, in accordance with an exemplary aspect of the present disclosure.

FIG. 5 depicts a summary of the basic method according to an aspect of the present disclosure. First, specifications for a finished fused connector termination may be set prior to commencement of the fusion process, shown as step 20. Next, at step 21, an amount of heat may be applied to the proximal region of the connector termination. After the heat is applied, the proximal region of the connector termination may be imaged, step 22. If step 23 is reached and the imaging feedback indicates that the proximal region of the connector termination meets the specifications, then the method stops (step 24) and no additional heat is applied to the proximal region. If step 25 is reached and the imaging feedback indicates that the proximal region of the connector termination does not meet the specifications, then step 21 is repeated and another round of heat is applied to the proximal region of the connector termination. The proximal region of the connector termination is then imaged again (step 22). Rounds of heating and imaging may be repeated as necessary until the images indicate that the proximal region of the connector termination meets the specifications.

In exemplary aspects, this method may deliver small amounts of heat incrementally, with imaging feedback obtained after each round of heating. For example, 50% of the amount of heat applied in prior, one-shot methods may be applied during each incremental heat application in exemplary methods described herein. In some aspects, the amount of heat delivered during each round of heating may further decrease. For example, 50% heat may be delivered to the connector termination, imaging feedback may be received, 20% heat may be delivered to the connector termination, imaging feedback may be received, 10% heat may be delivered to the connector termination, imaging feedback may be received, and so on until the connector termination falls within the range of preset specifications. The percentages provided are exemplary only, but are offered to further illustrate aspects of the disclosure.

Aspects of the present disclosure may improve coupling efficiency of produced connector terminations and thus increase the amount of energy that may ultimately be delivered by the optical fiber during medical procedures. In aspects in which the produced connector termination is used during a lithotripsy procedure, e.g., the amount of energy delivered to target tissue and/or a urinary stone may be increased. This may have the beneficial effect of reducing overall procedure times for treatment of a given volume or density of stone. For example, by reducing energy loss along the optical fiber, more energy may be delivered in a given amount of time, and thus, if a certain amount of energy is required to break up a stone, then a connector termination with increased coupling efficiency may be able to break up the stone in a shorter amount of time. Further, a connector termination with improved coupling efficiency may be able to accommodate a broader variety of laser console designs. For example, laser consoles with poorer beam quality may still provide sufficient energy if used with a connector termination having a higher coupling efficiency due to thermal lensing. Exemplary aspects may also decrease manufacturing waste by providing real-time, in-situ, quality control to reduce the number of finished connector terminations produced that do not meet predetermined specifications.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A method for producing a connector termination, the method comprising:
   applying an amount of heat to an unfused connector termination to produce an at least partially-fused connector termination, wherein the unfused connector termination comprises an inner optical fiber coaxially positioned within an outer ferrule;
   after applying the amount of heat, imaging the at least partially-fused connector termination; and
   based on the imaging, determining whether the at least partially-fused connector termination meets one or more of the following specifications: a diameter of a proximal face of the connector termination, a depth of the proximal face of the connector termination, a curvature of the proximal face of the connector termination, a surface smoothness of the proximal face of the connector termination, a depth of heat penetration, or an extent of fusion of the inner optical fiber to the outer ferrule.

2. The method of claim 1, wherein the amount of heat is a first amount of heat;
   wherein, if the connector termination is determined to not meet the one or more specifications, the method further comprises applying a second amount of heat to the connector termination; and
   wherein the imaging step and the determining step are repeated after applying the second amount of heat.

3. The method of claim 2, wherein the applying step, the imaging step, and the determining step are repeated until the connector termination is determined to meet the one or more specifications.

4. The method of claim 2, wherein the first amount of heat is different from the second amount of heat.

5. The method of claim 1, wherein the amount of heat is applied to one or more of a proximal face of the connector termination or a side of the connector termination.

6. The method of claim 1, wherein imaging the connector termination includes focusing three or more imaging devices on the connector termination.

7. The method of claim 6, wherein the three or more imaging devices are oriented to view the connector termination from a z-axis and at least one of an x-axis and a y-axis.

8. The method of claim 1, wherein imaging the connector termination includes focusing one or more imaging devices on at least two locations on the connector termination.

9. The method of claim 1, wherein imaging the connector termination includes one or more of focusing one or more imaging devices on one or more of: an edge of a dish formed on the proximal face of the connector termination or a central region of the dish.

10. The method of claim 1, wherein imaging the connector termination includes focusing one or more imaging devices on one or more of: an outer surface of the outer ferrule, an inner surface of the outer ferrule, or an outer surface of the inner optical fiber.

11. The method of claim 1, wherein imaging the connector termination is performed using an optical microscope.

12. The method of claim 1, wherein at least one of an imaging device, the connector termination, or a heat source is moved when imaging the connector termination or when applying heat to the connector termination.

13. A method for producing a connector termination, the method comprising:
   applying an amount of heat to one or more of a proximal face of an unfused connector termination or a side of the unfused connector termination, wherein the unfused connector termination comprises an inner optical fiber coaxially positioned within an outer ferrule;
   after applying the amount of heat, imaging the connector termination; and
   based on the imaging, determining whether the connector termination meets a pre-determined specification of a desired fused connector termination.

14. The method of claim 13, wherein imaging the connector termination includes focusing three or more imaging devices on the connector termination.

15. The method of claim 13, wherein imaging the connector termination includes focusing one or more imaging devices on one or more of: an outer surface of the outer ferrule, an inner surface of the outer ferrule, or an outer surface of the inner optical fiber.

* * * * *